United States Patent
Santhanagopal et al.

(10) Patent No.: US 11,915,107 B2
(45) Date of Patent: Feb. 27, 2024

(54) SOFTWARE BUILD MANAGEMENT USING MACHINE LEARNING MODEL

(71) Applicant: Oracle International Corporation, Redwood Shores, CA (US)

(72) Inventors: Harish Santhanagopal, Fremont, CA (US); Jiun-Cheng Wang, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 240 days.

(21) Appl. No.: 17/364,360

(22) Filed: Jun. 30, 2021

(65) Prior Publication Data

US 2023/0004858 A1    Jan. 5, 2023

(51) Int. Cl.
*G06N 20/00* (2019.01)
*G06F 8/20* (2018.01)

(52) U.S. Cl.
CPC .............. *G06N 20/00* (2019.01); *G06F 8/20* (2013.01)

(58) Field of Classification Search
CPC .................................. G06F 8/20; G06N 20/00
See application file for complete search history.

(56) References Cited

U.S. PATENT DOCUMENTS

| | | | |
|---|---|---|---|
| 10,423,403 B1* | 9/2019 | Natarajan | G06V 30/153 |
| 10,565,093 B1* | 2/2020 | Herrin | G06F 8/77 |
| 2018/0314953 A1* | 11/2018 | Benedict | G06F 8/71 |
| 2020/0218623 A1* | 7/2020 | Zhang | G06F 8/60 |

OTHER PUBLICATIONS

Mohammed Najah Mahdi et al., "Software Project Management Using Machine Learning Technique—A Review", [Online], pp. 1-39, [Retrieved from Interent on Apr. 19, 2023], <https://www.mdpi.com/2076-3417/11/11/5183> (Year: 2021).*

* cited by examiner

*Primary Examiner* — Ziaul A Chowdhury
(74) *Attorney, Agent, or Firm* — Invoke (57) ABSTRACT

Techniques for managing a software build using a machine learning model are disclosed. A system obtains historical data associated with historical software builds. The historical data includes attribute data for a plurality of development stages associated with a historical software build and labels indicating success or failure for the plurality of development stages. The system trains a machine learning model using the historical data associated with the historical software builds to generate predictions of success or failure of the plurality of development stages. The system receives attributes of a target software build and a selection of a first target development stage of the target software build. The system applies the machine learning model to the target software build to generate a first prediction of success or failure of the first target development stage.

21 Claims, 7 Drawing Sheets

SOFTWARE BUILD MANAGEMENT USING MACHINE LEARNING MODEL

TECHNICAL FIELD

The present disclosure relates to managing a software build process using a machine learning model. In particular, the present disclosure relates to applying a machine learning model to predict the success or failure of development stages of a software build and modify attributes of the software build to avoid failures.

BACKGROUND

Software build development involves a number of stages, some of which must be performed sequentially, and others which can overlap. Resources, including both human resources, such as code programmers, and computing resources, such as processors and servers, may be shared among multiple stages. A failure in any one software build development stage may result in a failure of the entire software build. For example, even if a software build passes a compile stage, the software build will still fail if it does not pass a security scan stage. Given the variety of potential software build specifications, software build characteristics, and resource allocation among development stages of a software build, it may be difficult for an entity interested in the success of the software build to identify potential sources of failure in the software build.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MACHINE LEARNING MANAGEMENT OF A SOFTWARE BUILD
4. TRAINING A MACHINE LEARNING MODEL
5. EXAMPLE EMBODIMENTS
6. COMPUTER NETWORKS AND CLOUD NETWORKS
7. MISCELLANEOUS; EXTENSIONS
8. HARDWARE OVERVIEW

1. General Overview

A software build development process includes multiple stages. A compiling stage converts a high-level code into machine code. In a testing stage, a system tests whether the software meets specification standards. In a security stage, a system identifies security vulnerabilities in the software. A failure at any stage may result in an overall failure of the software build and may affect the timing of dependent development stages. A failure as referred to herein may include failure to complete, failure to complete without errors, failure to complete within a particular time period, failure to complete within a set budget. In an example, two stages may share computing resources. A failure to complete one stage within a particular time may mean the other subsequent stage may not have access to the computing resources within a desired timetable.

In one or more embodiments, a machine learning model predicts the success or failure of a software build by identifying the success or failure of the development stages of the software build development process. The system trains a machine learning model with a dataset including attributes of historical software builds and indications of whether the historical software builds were successful or not. The trained machine learning model is applied to a target set of software build attributes to predict the success or failure of the software build as a whole. In other words, the trained machine learning model predicts whether the software build would successfully pass each stage of the software build development process. Alternatively, or additionally, the trained machine learning model may predict the success or failure of individual development stages of the software build development process. The machine learning model may also identify attributes of the software build that may be modified to avoid a failure.

For example, if the machine learning model determines that additional resources would be required to perform a compilation process within a specified time frame, the system may assign the additional human resources and computing resources to perform the code compilation. In addition, the machine learning model may identify one or more hardware or software upgrades required to successfully pass a development stage. For example, the machine learning model may identify a database upgrade required to successfully compile code for a particular software build. Alternatively, the machine learning model may identify a particular virtual machine upgrade required to successfully complete software testing. In addition, the system may modify a timing of two or more development stages. For example, the machine learning model may recommend allowing for more time to perform a compilation development stage.

The system may change a ratio at which resources are assigned to two different development stages. For example, if a stress testing stage and a security scan stage overlap, the system may assign a higher priority for accessing computing resources to one stage over the other to reduce a likelihood of failure of the software build.

In another example, the system modifies attributes of the software build by modifying a sequence in which two or more development stages or events (such as tests) within a single development stage occur.

In one embodiment, the system modifies attributes of the software build by comparing the attributes of the software build to the attributes of other software builds that were successful. For example, the machine learning model may embed the attributes of a target software build as a vector in an n-dimensional space. If the model predicts a failure of the target software build, the system may compare the data point associated with a target software build to neighboring data points associated with historical software builds which were successful. The system may then identify attribute values of the neighboring data points that may be applied to the target software build to reduce the likelihood of failure of the target software build.

One or more embodiments include notifying entities associated with different development stages of the software build of the success/failure predictions of the machine learning model. The system may associate different entities with different development stages. For example, a software coder may be associated with a pre-compile development stage and a compile development stage. A tester may be associated with a code testing stage. A supervisor may be associated with every stage. The system may generate a notification for the respective monitoring entity for each development stage. The notification may include the prediction of success or failure and any recommended modifications to the software build attributes.

One or more embodiments described in this Specification and/or recited in the claims may not be included in this General Overview section.

2. System Architecture

Figure 1:
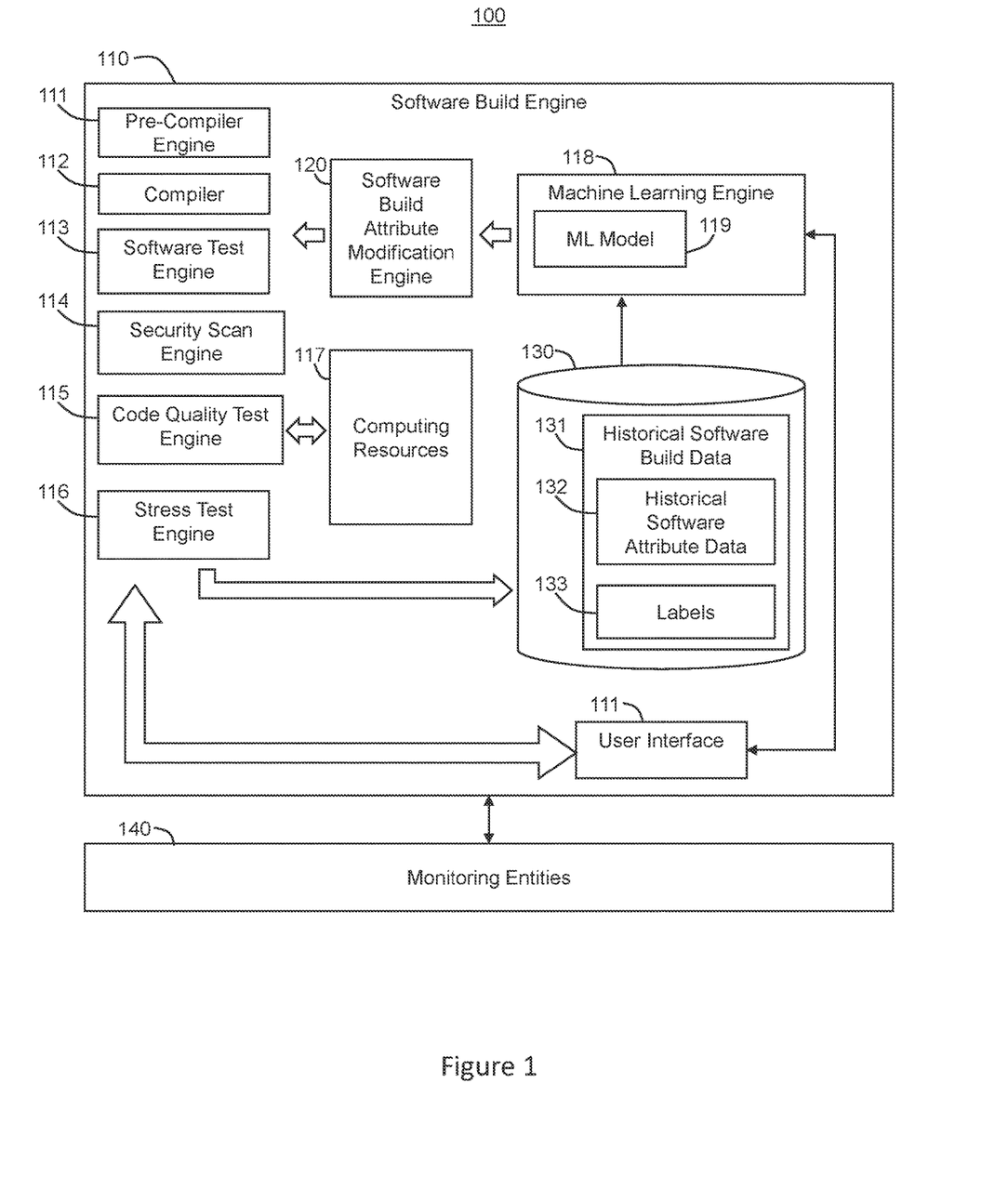
FIG. 1 illustrates a system in accordance with one or more embodiments.

FIG. 1 illustrates a system 100 in accordance with one or more embodiments. As illustrated in FIG. 1, system 100 includes a software build engine 110. The software build engine includes software build engines corresponding to development stages of a software build development process. The software build engines include a pre-compiler engine 111, a compiler 112, a software test engine 113, a security scan engine 114, a code quality test engine 115, and a build stress test engine 116.

The pre-compiler engine 111 uses computing resources 117 to generate software code, analyze software attributes to identify dependencies within the software or between the software and one or more separate applications, and analyze software attributes to identify required upgrades to applications used by the software. The computing resources 117 include processors, memory, data transmission elements, and any other computing components required to execute software code and applications. The computing resources 117 may be shared among the software build development stages. For example, the computing resources 117 may be allocated by resource (e.g., a software build development stage has full access to the computing resource for the duration of the software build development stage), by time (e.g. two or more stages may be assigned different periods of time to access the same computing resource 117 over the duration of the software build development stages), and by priority (e.g. two or more stages may be allowed access the same computing resource 117 over the duration of the software build development stages, and one stage is given access priority over another).

The compiler 112 uses computing resources 117 to convert software code from one programming language to another. For example, a programmer may utilize computing resources 117 assigned by the pre-compiler engine 111 to generate high-level software code. The compiler 112 may convert the high-level software code to machine code readable by a computer to execute the software. The compiler 112 may perform pre-processing to call or translate particular information prior to compiling; lexical analysis to convert one sequence of characters into a sequence of tokens or strings having pre-defined meaning for compilation; parsing of the computer code; semantic analysis of the computer code; conversion of the computer code to an intermediate representation prior to generating a final, translated code; code optimization, by selecting an optimal translation for the computer code to allow it to run faster, more efficiently, consume fewer resources, etc.; and generating an output translated computer code.

The software test engine 113 uses the computing resources 117 to analyze the functionality of the software build, isolate bugs, and identify any defects. The software test engine 113 executes components of the software build and compares the result with a specification for the software build.

The security scan engine 114 uses the computing resources 117 to analyze the software build to identify security weaknesses and determine whether the software meets a specified security level.

The code quality test engine 115 uses the computing resources 117 to determine whether the functionality of the software build matches the desired specifications. The code quality test engine 115 may identify, for example: whether particular components meet a specified functionality, whether the software build includes each specified component, and whether additional computing resources 117 are needed to meet build specifications.

The stress test engine 116 uses the computing resources 117 to test the performance of the software build under stress. For example, the stress test engine 116 may test performance of the software build when subjected to a data load beyond a threshold level or when provided with a number of access requests exceeding a threshold number of requests.

In one or more embodiments, the software build engine 110 communicates with monitoring entities 140 regarding the progress, completion, success, or failure of the software build stages and the software build as a whole. The software build engine 110 may identify different monitoring entities 140 to be notified regarding different software build stages. For example, the monitoring entities may include: a team of programmers, a team of software testers, a security specialist, a company administrator, and two customers. The company administrator and the two customers may be designated to be notified regarding the success or failure of the software build as a whole. One of the two customers may be designated to be additionally notified of any delays in a schedule of completing any of the software build development stages. The team of programmers may be designated to be notified only regarding the success or failure of the pre-compiler stage, the compiler stage, and the software test stage. The team of testers may be designated to be notified only regarding the success or failure of the software test development stage. The security specialist may be designated to be notified regarding the success or failure of the security scan stage. The company administrator may be designated to be notified regarding the success or failure of each development stage and delays in completing any of the stages.

A data repository 130 stores data attributes of the software build. In particular, the data repository 130 stores historical software build data 131. The historical software build data 131 includes historical software build attribute data 132 and labels 133 associated with the attribute data 132. The historical software build attribute data 132 includes attributes of a software build as a whole, as well as attributes of the individual development stages associated with the software build. Examples of attributes of a software build include functions, components, size, type, and specifications of the software build, as well as crashes, bugs, and failures identified during the development of the software build. Examples of attributes of the development stages associated with the software build include computing and human resources allocated to complete a particular development stage, a time required to complete the development stage, resources shared between two or more development stages, any conflicts among resources shared among the two or more development stages, and a sequence in which the development stages are carried out. The historical software build data 131 further includes labels 133 identifying a success or failure of individual software build stages and a software build as a whole.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the software build engine 110. Alternatively, or additionally, a data repository 130 may be implemented or executed on a computing system separate from the software build engine 110. A data repository 130 may be communicatively coupled to the software build engine 110 via a direct connection or via a network.

Information describing historical software build data 131 may be implemented across any of components within the system 100. However, this information is illustrated within the data repository 130 for purposes of clarity and explanation.

The software build engine 110 includes a machine learning engine 118. The machine learning engine 118 trains one or more machine learning models 119, based on the historical software build data 131, to predict the success or failure of software build stages and/or the success or failure of an entire software build. In one embodiment, the machine learning model 119 may predict a likely success or failure of a software build stage or software build without identifying the specific cause of the software build failure. For example, training the machine learning model 119 may cause the machine learning model to identify a relationship between (1) a combination of a software function and particular allocation of resources, and (2) a failure of a security scan stage of the software build. When the machine learning model 119 is applied to a set of target software build attributes having the software function and the particular allocation of resources, the model 119 may generate a failure prediction. However, the machine learning model 119 may not be able to identify the particular attributes in the software that cause the security scan failure. In an alternative embodiment, the machine learning model 119 identifies one or more software build attribute modifications to reduce a likelihood of failure of the machine learning model.

A software build attribute modification engine 120 may analyze one or both of: (1) the historical software attribute data 132 and (2) a prediction output from the machine learning engine 118 for a particular software build stage or software build to modify software build attributes or to generate recommendations for modification of software build attributes.

For example, in one embodiment, software attribute data 132 is converted into a vector to be provided to a machine learning model 119 to generate a prediction of success or failure for a software build and a particular software build stage. The software build attribute modification engine 120 may locate vectors associated with different software builds in an n-dimensional space. If the machine learning model 119 predicts a failure of a target software build, the software build attribute modification engine 120 may identify one or more neighboring data points associated with other software builds. The software build attribute modification engine 120 may identify the closest data points associated with successful software builds. The engine 120 may identify software build attribute differences between the target software build and a data point associated with a success-type software build. The software build attribute modification engine 120 may then generate one or more recommendations for modifying attributes of the target software build based on the comparison.

In one or more embodiments, the software build attribute modification engine 120 identifies the neighboring data points associated with success-type software builds by calculating a Euclidian distance between the data point associated with the target software build and the data points associated with the successful software builds in the n-dimensional space.

In the above example in which the machine learning model predicts a failure of a security scan for a target software build, the software build attribute modification engine 120 may identify a neighboring data point associated with a successful software build. The software build attribute modification engine 120 may recommend increasing computing resources 117 available to the security scan engine 114, modifying a ratio of resources between software stages or between different in-development software builds, modifying a sequence of development tasks by one or more software stages, or modifying a duration of one or more software build development stages. In one example, neither the machine learning model 119 nor the software build attribute modification engine 120 may identify the particular software attributes of the software build that may result in a failure of the software build. However, the modification of computing resources 117 allocated to the security scan engine 114 may result in the security scan engine 114 identifying and correcting a software attribute of the software build that causes the failure.

The monitoring entities 140 may interact with the software build engine 110 via the user interface 111. For example, the software build engine 110 may notify the monitoring entities 140 of the predictions of success or failure of a software build development stage, or of the entire software build, via the user interface 111. In one embodiment, the machine learning engine 118 generates a success/failure prediction of both an entire software build and of individual development stages in the software build process. The software build engine 110 may notify a monitoring entity associated with a particular software build development stage of the success/failure prediction for the individual stage, as well as of any recommendations for modifying attributes associated with the particular development stage. The software build engine 110 may notify monitoring entities 140 via email, enterprise-based messaging applications, publicly-sold messaging applications, or any other communication medium. For example, an enterprise may utilize a messaging application in which users may belong to one or more different groups, each group composed of different sets of members. The software build engine 110 may be configured to notify particular groups, via the messaging application, of the predicted or actual failure of a software build stage. The software build engine 110 may further be configured to notify the particular groups of suggested recommended software build attribute modifications. The software build engine 110 may further notify one group when a software build attribute modification associated with a different development stage affects resources available to, or timing for completion of, the stage associated with the group.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, software build engine 110 refers to hardware and/or software configured to perform operations described herein for managing development of a software build, predicting success or failure of the software build, and modifying software build attributes. Examples of operations for applying a machine learning model to manage a software build are described below with reference to FIG. 2.

In an embodiment, the software build engine 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Software Build Management Using Machine Learning Model

Figure 2:
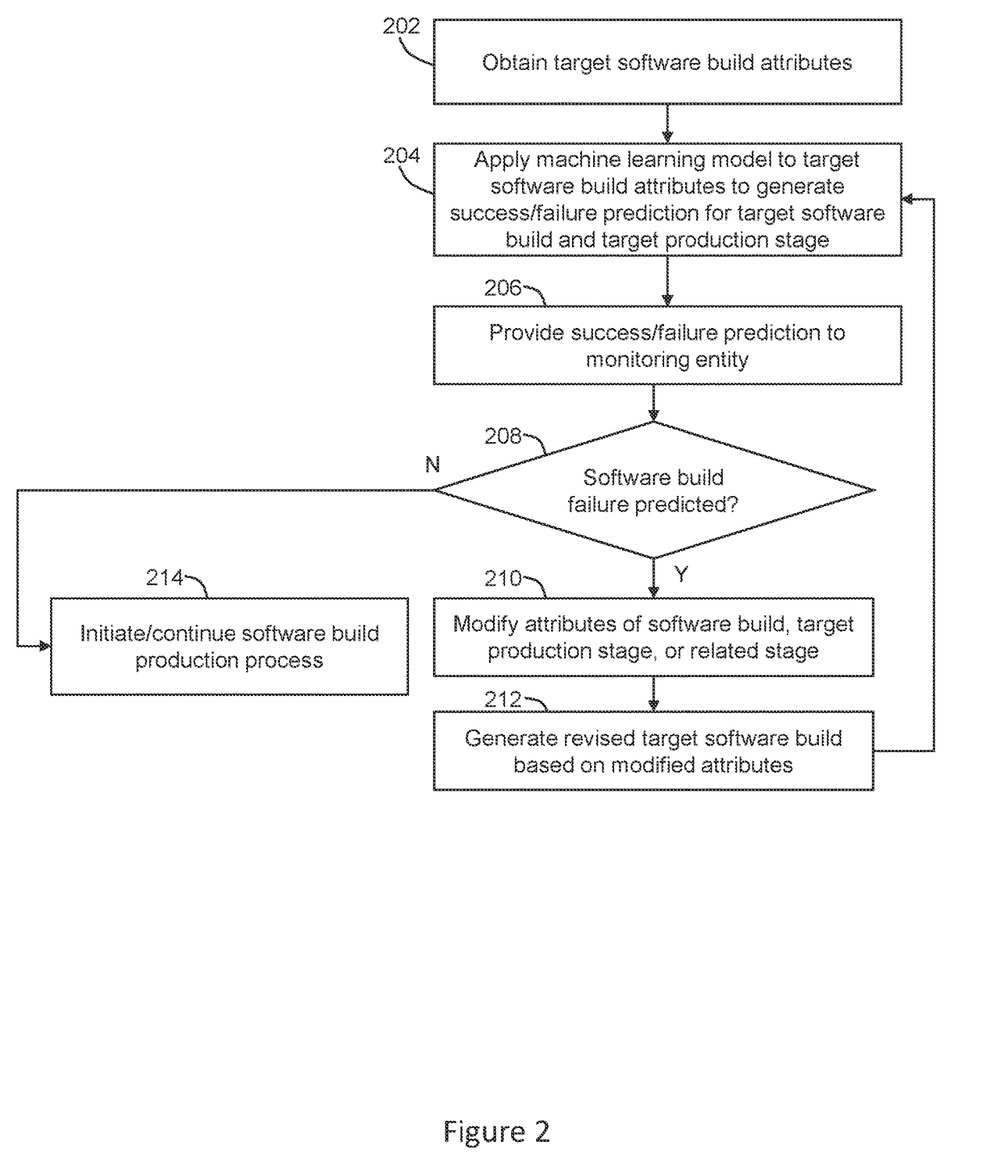
FIG. 2 illustrates an example set of operations for managing a software build using a machine learning model in accordance with one or more embodiments.

FIG. 2 illustrates an example set of operations for managing a software build using a machine learning model in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system obtains target software build attributes (Operation 202). Software build attributes include characteristics of the software build code, specifications for which the software build is designed, and computing and human resources assigned to software build development stages. For example, one set of software build attributes may include a set of specifications provided by a customer specifying desired functionality of a software application, a number of human programmers, testers, and managers assigned to code, test, and supervise the development of the software build, hardware resources assigned to different stages of the software build development, and characteristics of the software build code, including a size, application and hardware compatibility features, computing requirements, and application programming interface (API) specifications.

The system applies a machine learning model to the target software build attributes to generate a prediction of a success or failure of the target software build (Operation 204). The machine learning model has been trained using historical software build attribute data to identify correlations among software build attributes and the success or failure of the software builds. In one embodiment, the system predicts a success or failure of separate software build development stages together with a prediction associated with the entire build. For example, the model may predict the software build will compile successfully and test successfully, but the build will fail a code quality test and a security scan.

Examples of measures of success or failure include: whether a stage or build is completed on time; whether a build is susceptible to crashes or errors; whether a build performs specified functions within specified periods of time; whether a build is developed within a specified period of time; whether a build generates accurate results; whether a build meets specified compatibility criteria with other applications or with specified hardware; whether a build meets specified security criteria; whether a build meets specified code structure or format criteria; and whether the build operates within specified hardware constraints (such as providing a particular performance level when operating on a particular class of hardware).

The system provides the success or failure prediction to a monitoring entity (Operation 206). The system may identify particular monitoring entities associated with particular software build stages, and provide the success or failure predictions only to the monitoring entities associated with the particular software build stages. For example, if two customers are interested in a software build, one customer may request notifications only for a final success or failure prediction for the entire software build. The other customer may request notifications for predicted failures of the security scan of the software build.

The system determines whether a target software build development stage is associated with a failure prediction by the machine learning model (Operation 208). If the target software build development stage is associated with a failure prediction, the system may modify attributes of the target development stage or of a related stage. Modifying the attributes of the target stage or a related stage may include, for example: identifying components of the software build that have a high likelihood of failure; notifying monitoring entities of software components that are identified as having a high likelihood of contributing to build failure; assigning additional human resources (such as programmer-hours) to a particular stage of the software build; and assigning additional computing resources, such as server access time, cloud-based virtual machines, bandwidth, or processing power, to a particular development stage.

In one or more embodiments, the system automatically modifies software build attributes based on identifying a failure of one or more stages of the software build development process. In an alternative embodiment, the system generates a notification to monitoring entities prior to modifying any software build attributes. The notification may include recommendations for modifying the software build attributes.

In one or more embodiments, the system generates a confidence score associated with the prediction of success or failure of the software build. The system may determine whether to modify attributes of the software build based on the confidence score. For example, if the system determines that the data set used to train the machine learning model did not include data points similar to a data point associated with a target software build, the system may assign a low confidence score to the resulting prediction of failure. As a result, the system may adjust the modifications to the software build attributes based on the confidence score. If the confidence score is sufficiently low, the system may refrain from modifying attributes of the software build. Alternatively, the system may provide the recommended attribute modifications to a monitoring entity, together with the confidence score. If the confidence score is relatively high, the system may proceed to modify, or recommend modification of, the attributes of the software build.

The system generates a revised target software build based on the modified software build attributes (Operation 212). The revised target software build may include, for example, modifications to a software build specification, modifications to a timeline for completing development of the software build, and a modification of resources used to produce the software build.

If a software build success is predicted (Operation 208), the system initiates or continues the software build development process (Operation 214). The system may update the target build software attributes and re-run the machine learning analysis at any point in the software build development process. For example, the system may apply the machine learning model to a set of software build attributes prior to generating code to develop the software build, and the model may predict a successful build. However, in the course of development, a new security threat may arise, resulting in a change in the software build specification. The system may apply the machine learning model to the updated software build attributes to determine whether the software build would still pass a security scan. Additional modifications may include: delays in programming or testing, changes in available hardware resources, and changes in customer-defined requirements for the software build. For example, a customer may request new functionality from the software build. The system may re-apply the machine learning model to modified or updated sets of software build attributes throughout a software build development process.

4. Training a Machine Learning Model

Figure 3:
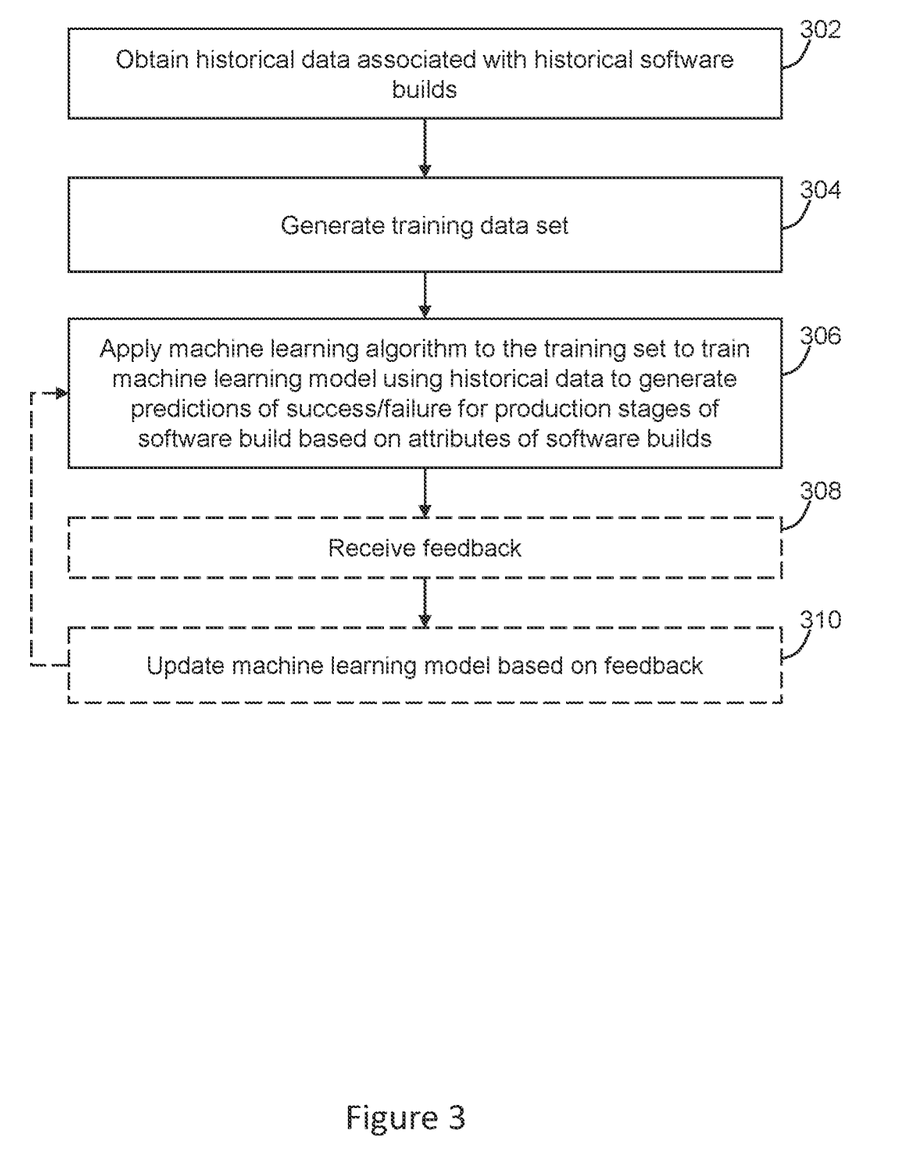
FIG. 3 illustrates an example set of operations for training a machine learning model in accordance with one or more embodiments.

FIG. 3 illustrates an example set of operations for training a machine learning model in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A system obtains historical data associated with historical software builds (Operation 302). The historical data includes data attributes of the historical software builds, including, for example: a specification for the software build specifying a desired functionality of the software build, actual functionality of the software build, components, size, and type of software code, crashes, bugs, and failures identified during the development of the software build, computing and human resources allocated to complete a particular development stage for a software build, a time required to complete the development stage, resources shared between two or more development stages, any conflicts among resources shared among the two or more development stages, and a sequence in which the development stages are carried out.

The system generates a training data set using the historical data (Operation 304). The training data set includes a set of software build attributes and labels indicating the success or failure of one or both of the stages of the software build development process and success or failure of the entire software build.

The system applies a machine learning algorithm to the training set to train a machine learning model to predict the success or failure of a software build based on the software build attributes (Operation 306). Examples of measures of success or failure include: whether a stage or build is completed on time; whether a build is susceptible to crashes or errors; whether a build performs specified functions within specified periods of time; whether a build generates accurate results; whether a build meets specified compatibility criteria with other applications; whether a build meets specified security criteria; whether a build meets specified code structure or format criteria; and whether the build operates within specified hardware constraints (such as providing a particular performance level when operating on a particular class of hardware). In one embodiment, the machine learning model is trained to identify particular attributes that are likely to contribute to the failure of a software build or of a particular development stage of the software build. In another embodiment, the machine learning model does not identify particular attributes that are likely to contribute to the failure of a software build or of a particular development stage of the software build. Instead, the machine learning model is trained to identify correlations between entire sets of attributes (not necessarily individual attributes) and the success or failure of the software build.

In one or more embodiments, the prediction of success or failure is associated with a confidence level. For example, if the system determines that the data set used to train the machine learning model does not include any data points within a predefined threshold distance from a data point associated with the target software build, the system may assign a low confidence level to the prediction of success or failure.

In one or more embodiments, the system predicts the success or failure of the entire software build. In other words, the system determines whether the target software build, having a particular set of software build attributes, would successfully pass each stage of the software build development process. In addition, or in the alternative, the system may predict the success or failure of individual software build stages. For example, the system may determine whether the build would successfully compile, successfully pass testing, and successfully pass a security scan.

In addition to a prediction of success or failure, the system may generate one or more recommendations for modifying software build attributes based on the output from the machine learning model. For example, the model may identify a lack of assigned hardware resources at a testing stage as a contributing cause of a software build failure. The system may generate a recommendation to increase the hardware resources assigned to the testing stage of the software build development process.

The system receives user feedback based on the prediction of success or failure and the any recommendations for modifying the software build attributes (Operation 308). For example, the feedback may indicate that a prediction of failure associated with a low confidence score should be labeled a prediction of "success."

The system updates the machine learning model based on the feedback (Operation 310). For example, if a user indicates that a particular set of software build attributes should be associated with a "success" prediction, the system retrains the machine learning model by adjusting parameters of the model such that the particular attributes will result in a "success" prediction.

4. Example Embodiment

Detailed examples are described below for purposes of clarity. Components and/or operations described below should be understood as one specific example which may not be applicable to certain embodiments. Accordingly, components and/or operations described below should not be construed as limiting the scope of any of the claims.

Figure 4:
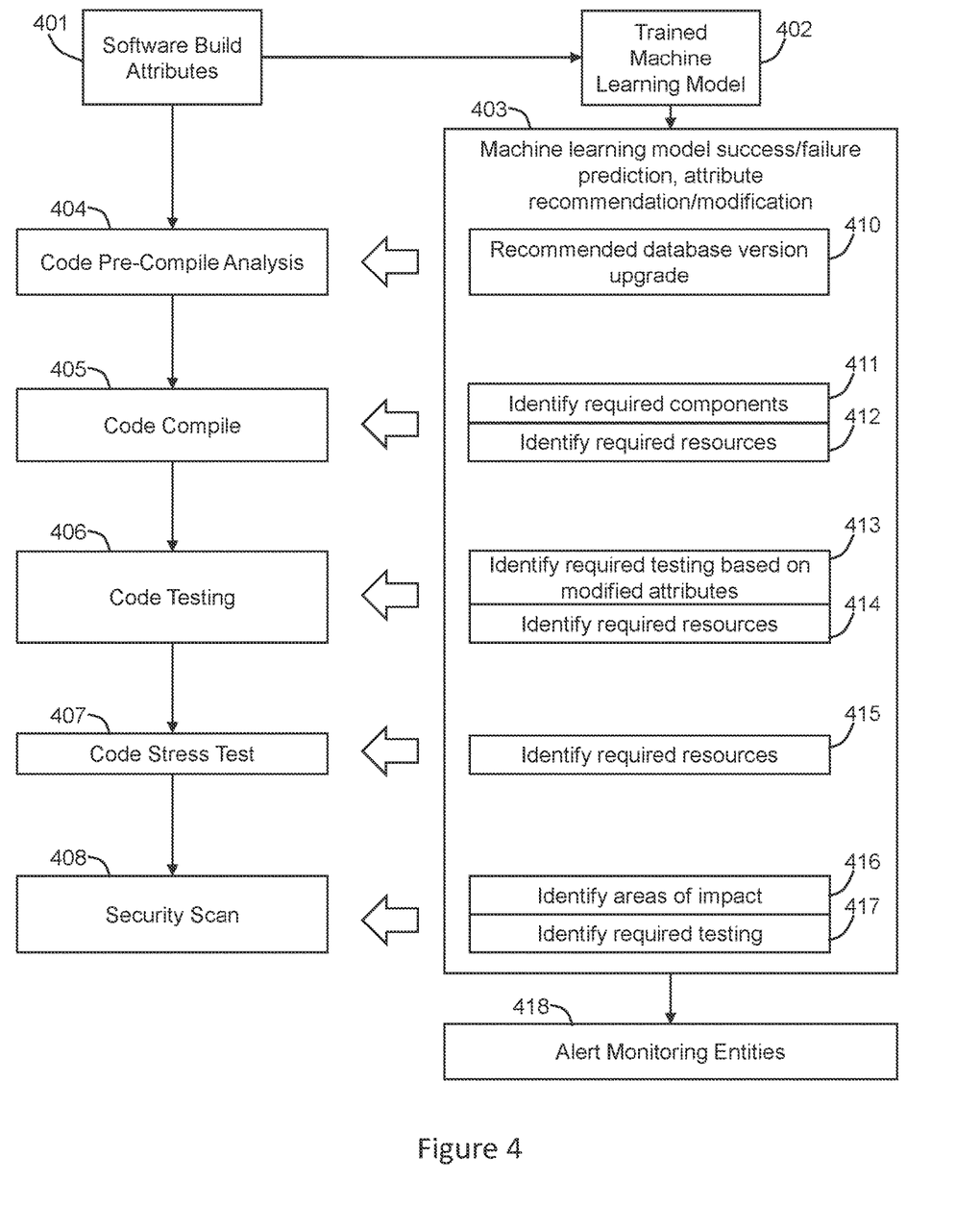
FIG. 4 illustrates an example set of operations according to one embodiment.

FIG. 4 illustrates an example in which a system applies a machine learning model to a set of software build attributes to generate a prediction of success or failure for different stages of a software build development process.

A system is provided with a set of software build attributes 401 for a software build. The system applies a trained machine learning model 402 to the software build attributes 401 to generate, for the entire build or for one or more development stages, one or more of: (1) a prediction of success or failure, (2) a recommendation for modifying software build attributes, and (3) a modification to the software build attributes 401.

In the embodiment illustrated in FIG. 4, the software build development process includes a code pre-compile analysis 404, a code compile stage 405, a code testing stage 406, a stress test stage 407, and a security scan stage 408. Upon applying the machine learning model 402 to the software build attributes 401, the system identifies a database version upgrade 410 associated with the pre-compile analysis 404. The database version upgrade may be required for the software build to succeed (resulting in a "failure" prediction for the software build) or may be a recommendation to improve performance of the software build. The system alerts monitoring entities 418 associated with the code pre-compile analysis 404.

In addition, the machine learning model 402 may identify required components 411 and required resources 412 associated with a code compile stage 405. The system may notify monitoring entities 418 associated with the code compile stage 405. The machine learning model 402 may identify required testing 413 and required resources 414 associated with a code testing stage 406. For example, the machine learning model 402 may determine that an additional cloud instance should be provisioned to the code testing stage 406 to increase the speed of the code testing stage 406. The system may determine that the increase in speed is required for the software build development to maintain a specified schedule. Alternatively, the system may determine that the increase in speed will improve the likelihood of detecting software code failures in the code testing stage 406. The system may notify monitoring entities 418 associated with the code testing stage 406. The machine learning model 402 may identify required resources 415 associated with a code stress stage 407. For example, the machine learning model may determine that the suite of stress testing provided in the software build is inadequate to ensure proper stress testing. The model 402 may identify one or more additional stress tests, or may recommend different stress metrics, for the stress test stage 407. The system may notify monitoring entities 418 associated with the code stress stage 407. The machine learning model 402 may identify areas of impact 416 and required testing 417 associated with a security scan stage 408. The system may notify monitoring entities 418 associated with the security scan stage 408.

Figure 5:
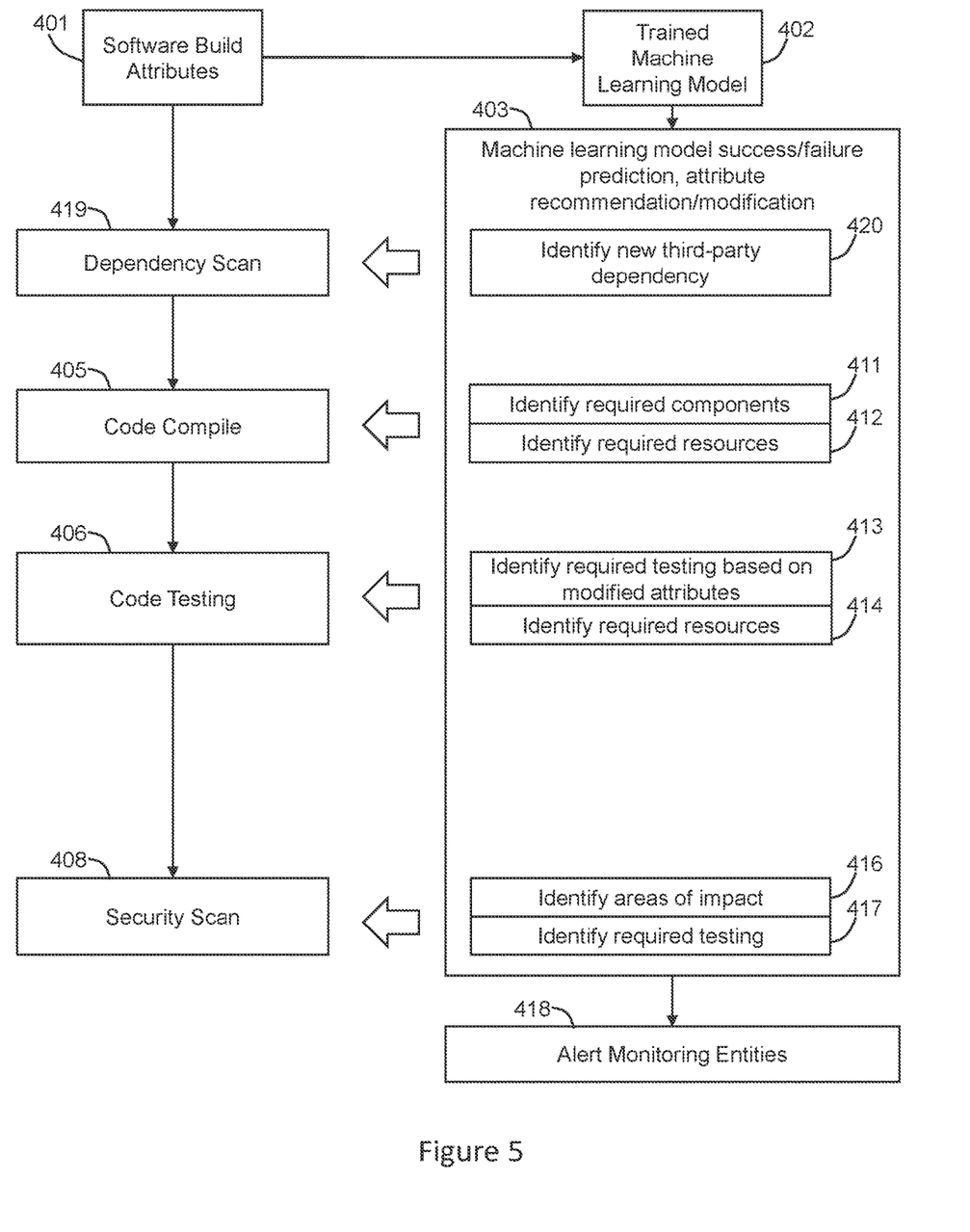
FIG. 5 illustrates an example set of operations according to another embodiment.

FIG. 5 illustrates another example embodiment in which a system applies a machine learning model to a set of software build attributes to generate a prediction of success or failure for different stages of a software build development process.

A software build development process according to FIG. 5 may include a dependency scan stage 419 to identify dependencies between the software build and any other applications or builds. The machine learning model 402 may identify one or more third-party dependencies 420 required to perform or successfully pass the dependency scan stage 419. The system may notify monitoring entities 418 associated with the dependency scan stage 419.

Figure 6:
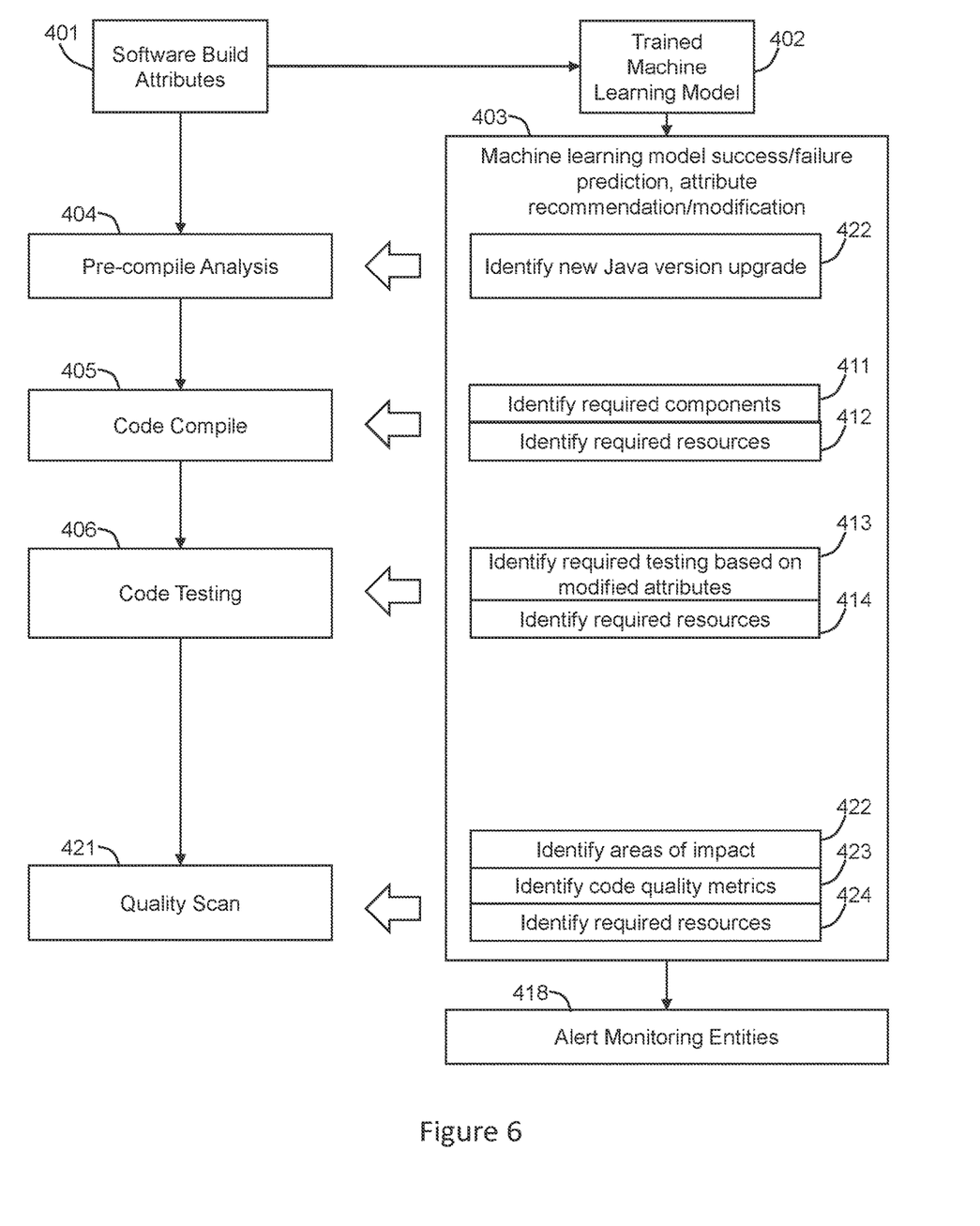
FIG. 6 illustrates an example set of operations according to yet another embodiment.

FIG. 6 illustrates another example embodiment in which a system applies a machine learning model to a set of software build attributes to generate a prediction of success or failure for different stages of a software build development process.

As illustrated in FIG. 6, a machine learning model 402 may identify a software upgrade 422 associated with the pre-compile analysis 404 that may be required to perform the pre-compile analysis 404. The machine learning model 402 may also identify areas of impact 422, code quality metrics 423, and required resources 424 required to perform a quality scan 421 of the software build. For example, the machine learning model 402 may identify an additional deprecation test and an additional performance test that should be performed in association with the quality scan 421 to improve a likelihood of success of the quality scan 421 stage. In addition, the machine learning model 402 may recommend provisioning the quality scan 421 with an additional cloud instance to allow for additional code quality scanning. The system may notify monitoring entities 418 associated with the pre-compile analysis 404 and the quality scan 421, respectively.

6. Computer Networks and Cloud Networks

In one or more embodiments, a software build engine is implemented in a computer network that provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client, including clients operated by one or more monitoring entities, may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
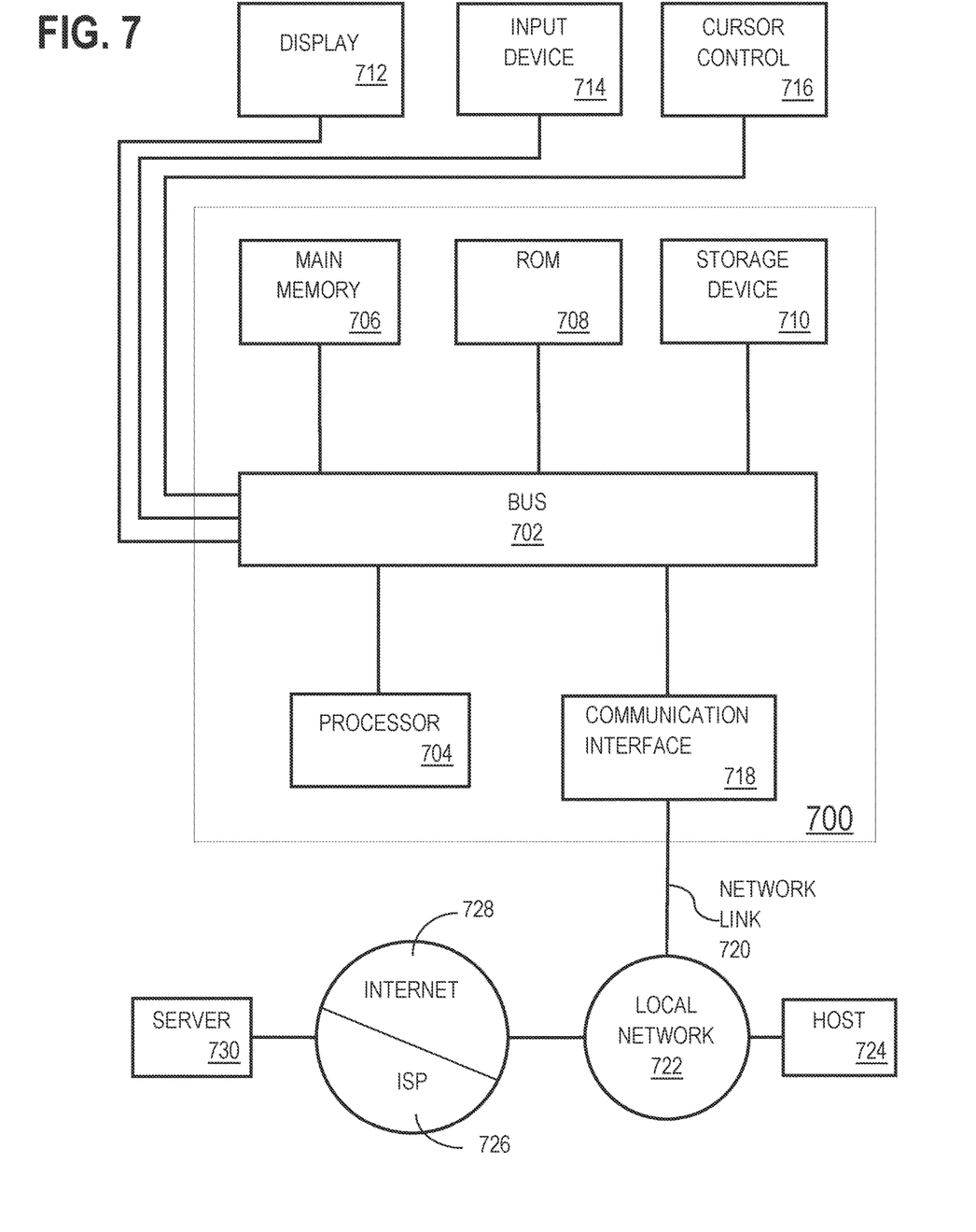
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    obtaining historical data associated with historical software builds, the historical data including:
        attribute data for a plurality of development stages associated with a historical software build, and
        labels indicating success or failure for the plurality of development stages,
    training a machine learning model using the historical data associated with the historical software builds to generate predictions of success or failure of the plurality of development stages;
    receiving attributes of a target software build comprising a plurality of target development stages;
    applying the machine learning model to the target software build to generate a first prediction of success or failure of at least a first target development stage among the plurality of target development stages; and
    modifying, based on the predictions of success or failure of the plurality of development stages, a set of computing resources assigned to one or more of the plurality of target development stages, at least by:
        determining that a first resource usage of a first target development stage overlaps with a second resource usage of a second target development stage; and
        based on determining that (a) the first resource usage of the first target development stage overlaps with the second resource usage of the second target development stage, and (b) the machine learning model predicts a failure of the first target development stage: increasing a ratio of the first resource usage of the first target development stage relative to the second resource usage of the second target development stage.

2. The method of claim 1, further comprising:
modifying, based on the predictions of success or failure of the plurality of development stages, attributes of one or more of the plurality of development stages.

3. The method of claim 2, wherein the attributes of the one or more of the plurality of development stages include timing relationships between two or more development stages of the plurality of development stages.

4. The method of claim 2, wherein the attributes of the one or more of the plurality of development stages include a sequence of operations performed by the first target development stage.

5. The method of claim 2, wherein the attributes of the one or more of the plurality of development stages include resources shared by the one or more of the plurality of development stages, and
modifying the attributes of the one or more of the plurality of development stages includes modifying a ratio of resource usage of the resources by the first target development stage and a second development stage.

6. The method of claim 2, wherein the machine learning model further generates a recommendation for modifying the attributes of the one or more of the plurality of development stages.

7. The method of claim 6, wherein generating the recommendation for modifying the attributes of the one or more of the plurality of development stages comprises:
identifying, in an n-dimensional space, a first data point associated with the target software build and associated with a failure prediction;
identifying, in the n-dimensional space, a neighboring data point associated with a software build and associated with a success prediction;
generating the recommendation for modifying the attributes of the one or more of the plurality of development stages based on at least one difference in attribute values between the first data point and the neighboring data point.

8. The method of claim 1, further comprising:
identifying a first entity associated with the first target development stage and a second entity associated with a second target development stage;
wherein applying the machine learning model to the target software build results in generating the first prediction of the success or failure of the first target development stage and a second prediction of success or failure of the second target development stage;
transmitting, to the first entity, a first notification including first prediction of the success or failure of the first target development stage, without including the second prediction of the success or failure of the second target development stage; and
transmitting, to the second entity, a second notification including second prediction of the success or failure of the second target development stage, without including the first prediction of the success or failure of the first target development stage.

9. A non-transitory computer readable medium comprising instructions which, when executed by one or more hardware processors, causes performance of operations comprising:
obtaining historical data associated with historical software builds, the historical data including:
attribute data for a plurality of development stages associated with a historical software build, and
labels indicating success or failure for the plurality of development stages,
training a machine learning model using the historical data associated with the historical software builds to generate predictions of success or failure of the plurality of development stages;
receiving attributes of a target software build comprising a plurality of target development stages;
applying the machine learning model to the target software build to generate a first prediction of success or failure of at least a first target development stage among the plurality of target development stages; and
modifying, based on the predictions of success or failure of the plurality of development stages, a set of computing resources assigned to one or more of the plurality of target development stages, at least by:
determining that a first resource usage of a first target development stage overlaps with a second resource usage of a second target development stage; and
based on determining that (a) the first resource usage of the first target development stage overlaps with the second resource usage of the second target development stage, and (b) the machine learning model predicts a failure of the first target development stage: increasing a ratio of the first resource usage of the first target development stage relative to the second resource usage of the second target development stage.

10. The medium of claim 9, wherein the operations further comprise:
modifying, based on the predictions of success or failure of the plurality of development stages, attributes of one or more of the plurality of development stages.

11. The medium of claim 10, wherein the attributes of the one or more of the plurality of development stages include timing relationships between two or more development stages of the plurality of development stages.

12. The medium of claim 10, wherein the attributes of the one or more of the plurality of development stages include a sequence of operations performed by the first target development stage.

13. The medium of claim 10, wherein the attributes of the one or more of the plurality of development stages include resources shared by the one or more of the plurality of development stages, and
modifying the attributes of the one or more of the plurality of development stages includes modifying a ratio of resource usage of the resources by the first target development stage and a second development stage to either increase resources used by the first target development stage relative to the second development stage, or to decrease the resources used by the first target development stage relative to the second development stage.

14. The medium of claim 10, wherein the machine learning model further generates a recommendation for modifying the attributes of the one or more of the plurality of development stages.

15. The medium of claim 14, wherein generating the recommendation for modifying the attributes of the one or more of the plurality of development stages comprises:
identifying, in an n-dimensional space, a first data point associated with the target software build and associated with a failure prediction;

identifying, in the n-dimensional space, a neighboring data point associated with a software build and associated with a success prediction;

generating the recommendation for modifying the attributes of the one or more of the plurality of development stages based on at least one difference in attribute values between the first data point and the neighboring data point.

16. The medium of claim 9, wherein the operations further comprise:

identifying a first entity associated with the first target development stage and a second entity associated with a second target development stage;

wherein applying the machine learning model to the target software build results in generating the first prediction of the success or failure of the first target development stage and a second prediction of success or failure of the second target development stage;

transmitting, to the first entity, a first notification including first prediction of the success or failure of the first target development stage, without including the second prediction of the success or failure of the second target development stage; and transmitting, to the second entity, a second notification including second prediction of the success or failure of the second target development stage, without including the first prediction of the success or failure of the first target development stage.

17. The medium of claim 16, wherein the machine learning model further generates a third prediction of success or failure of the target software build, wherein the first notification and the second notification both include the third prediction of the success or failure of the target software build.

18. The medium of claim 9, wherein the operations further comprise:

calculating a confidence score associated with the first prediction, the confidence score associated with a likelihood that the success or failure indicated by first prediction will occur.

19. The non-transitory computer readable medium of claim 9, wherein modifying the set of computing resources assigned to the one or more of the plurality of target development stages comprises at least one of:

spinning up a new virtual machine to perform operations of a particular target development stage, or generating a first recommendation to spin up the new virtual machine to perform the operations of the particular target development stage; and assigning one or more additional processors to perform the operations of the particular target development stage, or generating a second recommendation to assign the one or more additional processors to perform the operations of the particular target development stage.

20. The non-transitory computer readable medium of claim 9, wherein modifying the set of computing resources assigned to the one or more of the plurality of target development stages comprises at least one of:

identifying a hardware upgrade required to successfully perform operations of one or more of the target development stages; and identifying a software upgrade required to successfully perform operations of one or more of the target development stages.

21. A system, comprising:

one or more processors; and memory storing instructions that, when executed by the one or more processors, cause the system to perform:

obtaining historical data associated with historical software builds, the historical data including:

attribute data for a plurality of development stages associated with a historical software build, and labels indicating success or failure for the plurality of development stages, training a machine learning model using the historical data associated with the historical software builds to generate predictions of success or failure of the plurality of development stages;

receiving attributes of a target software build comprising a plurality of target development stages;

applying the machine learning model to the target software build to generate a first prediction of success or failure of at least a first target development stage among the plurality of target development stages; and modifying, based on the predictions of success or failure of the plurality of development stages, a set of computing resources assigned to one or more of the plurality of target development stages, at least by:

determining that a first resource usage of a first target development stage overlaps with a second resource usage of a second target development stage; and based on determining that (a) the first resource usage of the first target development stage overlaps with the second resource usage of the second target development stage, and (b) the machine learning model predicts a failure of the first target development stage: increasing a ratio of the first resource usage of the first target development stage relative to the second resource usage of the second target development stage.

* * * * *

UNITED STATES PATENT AND TRADEMARK OFFICE
CERTIFICATE OF CORRECTION

PATENT NO. : 11,915,107 B2
APPLICATION NO. : 17/364360
DATED : February 27, 2024
INVENTOR(S) : Santhanagopal et al.

Page 1 of 1

It is certified that error appears in the above-identified patent and that said Letters Patent is hereby corrected as shown below:

On the Title Page

Column 2, under Other Publications, Line 3, delete "Interent" and insert -- Internet --, therefor.

Signed and Sealed this
Thirty-first Day of December, 2024

Derrick Brent
*Acting Director of the United States Patent and Trademark Office*